United States Patent
Cummins

(10) Patent No.: US 9,874,288 B2
(45) Date of Patent: Jan. 23, 2018

(54) OSCILLATING PRESSURE IN A FINITE VOLUME

(71) Applicant: Patrick Dean Cummins, Louisville, KY (US)

(72) Inventor: Patrick Dean Cummins, Louisville, KY (US)

(*) Notice: Subject to any disclaimer, the term of this patent is extended or adjusted under 35 U.S.C. 154(b) by 432 days.

(21) Appl. No.: 14/623,659

(22) Filed: Feb. 17, 2015

(65) Prior Publication Data

US 2015/0247590 A1   Sep. 3, 2015

Related U.S. Application Data

(60) Provisional application No. 61/946,835, filed on Mar. 2, 2014.

(51) Int. Cl.

| F16K 17/04 | (2006.01) |
|---|---|
| F16K 15/08 | (2006.01) |
| F16K 15/12 | (2006.01) |
| A47J 27/04 | (2006.01) |
| A23L 5/10 | (2016.01) |
| F16K 24/06 | (2006.01) |

(52) U.S. Cl.
CPC .............. *F16K 17/046* (2013.01); *A23L 5/17* (2016.08); *A47J 27/04* (2013.01); *F16K 15/08* (2013.01); *F16K 15/12* (2013.01); *F16K 24/06* (2013.01); *Y10T 137/7781* (2015.04); *Y10T 137/7839* (2015.04); *Y10T 137/7845* (2015.04); *Y10T 137/7846* (2015.04); *Y10T 137/7925* (2015.04)

(58) Field of Classification Search
CPC ........ F16K 15/08; F16K 15/12; F16K 17/046; Y10T 137/7925; Y10T 137/7781; Y10T 137/7846; Y10T 137/7839; Y10T 137/7845; A23L 5/17; A47J 27/04
See application file for complete search history.

(56) References Cited

U.S. PATENT DOCUMENTS

| 991,671 | A | * | 5/1911 | Thurman | ................ F16K 24/06 |
|---|---|---|---|---|---|
| | | | | | 137/516.11 |
| 1,913,509 | A | * | 6/1933 | Rack | .................. B65D 47/2093 |
| | | | | | 137/536 |
| 3,039,699 | A | * | 6/1962 | Allen | ..................... B05B 1/083 |
| | | | | | 116/DIG. 18 |

(Continued)

*Primary Examiner* — Atif Chaudry
(74) *Attorney, Agent, or Firm* — Patrick Dean Cummins

(57) ABSTRACT

An apparatus for allowing the repetitive oscillation of pressure in a container or vessel having a finite volume. The apparatus comprises a valve having first opening, a valve enclosure having a second opening, and a first tension device. In some embodiments the apparatus can have a chamber capable of oscillating in volume. The oscillation of the chamber volume causes a decrease in the pressure of the container. As the pressure of the space or container decreases, two openings of the apparatus become more proximate. Eventually the openings partially overlap, allowing a gas, or fluid, to enter the container, increasing pressure of the space or container. As a result of the pressure increase, the first opening and second opening become less proximate by a force of the first tension device. The apparatus can allow the container to approach substantially perfect vacuum and rise toward atmospheric pressure.

20 Claims, 10 Drawing Sheets

(56) References Cited

U.S. PATENT DOCUMENTS

| | | | | |
|---|---|---|---|---|
| 6,116,270 A * | 9/2000 | Kobes | ............... | E21B 34/06 |
| | | | | 137/494 |
| 6,910,871 B1 * | 6/2005 | Blume | ............... | F04B 53/007 |
| | | | | 137/512 |
| 2009/0126806 A1 * | 5/2009 | Hamza | ............... | F04B 49/022 |
| | | | | 137/511 |

* cited by examiner

OSCILLATING PRESSURE IN A FINITE VOLUME

FIELD

The present disclosure relates generally to valves and, more particularly, to apparatuses, systems, and methods for using an apparatus to oscillate pressure in a finite volume for which the apparatus can be attached.

BACKGROUND

A valve is an apparatus for controlling the movement of gas or fluids. Valves can be used in systems for reducing pressure in a container or finite space. Such systems can be used for material impregnation, but are typically inefficient and inconvenient to operate.

SUMMARY

The present disclosure provides apparatuses and devices which allow for the repetitive decrease and increase, or herein oscillations, of pressure in a finite space, container, finite volume, or vessel, for which the apparatus can be attached, without interruption to the operation of the apparatus.

In some embodiments, an apparatus comprises a valve having a first opening, a valve enclosure having a second opening, and a first tension device. The first tension device displaces the first opening of the valve from the second opening of the valve enclosure so that the first opening and the second opening are not overlapping or at least partially overlapping when the apparatus is at rest or not being acted on by some external force with respect to the apparatus. The displacement prevents air or fluid from entering or exiting a vessel or container, for which the apparatus can be attached, through the at least partial overlap of the first opening and second opening. However, the first opening and second opening can at least partially overlap when a force acting on the apparatus overcomes a force of the first tension device. A negative pressure in the vessel can overcome the force of the first tension device and cause the first opening and second opening to at least partially overlap, allowing a gas or fluid to enter the vessel simultaneously through both the first opening and second opening. As a result of the gas or fluid entering the vessel, the first opening and second opening become less proximate because the negative pressure (i.e., vacuum) pulling on the apparatus will become more positive. When the first opening and second opening no longer overlap, no more gas or fluid can enter the vessel, and thus, a negative pressure can be applied to the vessel again thereby repeating the aforementioned process.

Another example of the apparatus described herein includes a chamber having an adjustable volume, a first check valve, and a second check valve. The arrangement of the apparatus and the aforementioned components is such that an increase in a volume of the chamber causes a gas, or fluid, to enter the chamber through the first check valve from a vessel to which the apparatus can be attached. Additionally, a decrease in the volume of the chamber causes a gas, or fluid, to exit the chamber through the second check valve. Moreover, an increase in a volume of the chamber causes a decrease of pressure in the vessel, to which the apparatus can be attached, and from which the gas or fluid derives. As the pressure of the vessel decreases, the first opening and second opening are forced to become more proximate.

In some embodiments, the apparatus is configured such that when the pressure of the finite space, container, or vessel increases, the first opening and second opening at least partially overlap to allow a gas, or fluid, to enter the space simultaneously through the at least partially overlapping first opening and second opening.

In some embodiments, the apparatus includes a first seal portion, for pressing and sealing the apparatus to a container, thereby preventing a gas or fluid from escaping the apparatus or the container. In some embodiments, the first seal portion can include, but is not limited to a compressible gasket or a threaded gasket. The first seal portion can be an extension of the first tension device such that the first tension device and first seal portion create a single, integral and/or unified seal between the apparatus (or valve enclosure, or second enclosure portion in some embodiments) and the container, vessel, finite volume, or finite space for which the apparatus is operatively coupled to.

In some embodiments, the apparatus is configured such that the proximity of the first opening and second opening is governed in part by the first tension device, wherein the first opening and second opening become more proximate when the pressure of the container overcomes a force of tension of the first tension device.

In some embodiments, the apparatus is configured such that the force of tension of the tension device is adjustable by a user of the apparatus.

In some embodiments, the apparatus is configured such that a valve enclosure of the apparatus is adjustable to alter the proximity of the first opening to the second opening. In some embodiments the valve enclosure is adjusted by means of a first enclosure portion and a second enclosure portion, wherein both portions are threaded such that rotating one portion clockwise or counter clockwise will adjust one or more of the portions accordingly. Furthermore, the adjustment of the valve enclosure can comprise a locking mechanism such that when the valve enclosure is unlocked the valve enclosure can be freely moved into a variety of positions and then locked into a desired position by the locking mechanism.

In some embodiments, the apparatus is configured such that when a first seal portion of the apparatus is coupled to a finite space, container, or vessel, an oscillation of the chamber volume causes the first opening and second opening to at least partially overlap, and the pressure of the finite space, container, or vessel to increase as a result of a gas or fluid entering the finite space, container, or vessel through the at least partial overlap of the first opening and the second opening.

In some embodiments, the apparatus includes a valve seal portion between the valve and valve enclosure to prevent a gas or fluid from moving between the valve and valve enclosure except for when the first opening and second opening at least partially overlap. In some embodiments, the valve seal portion is compressible such that the valve seal portion exists firmly between the valve and valve enclosure. In some embodiments, the valve seal portion wraps around the valve and makes contact with the valve enclosure above and below the first opening. Specifically, unless the first opening and second opening are at least partially overlapping, the valve seal portion can prevent a gas or fluid from moving through the first opening and second opening by sealing at least a portion of an area above and below the first opening. Furthermore, the valve seal portion can be removable. Additionally, the valve seal portion can be permanently attached or integral to the valve, such that the valve itself, unless the first opening and second opening are at least partially overlapping, prevents a gas or fluid from moving through the first opening and second opening by sealing at least a portion of an area above and below the first opening. Furthermore, in embodiments where the tension device is a spring or other non-sealing device, an additional seal portion can be necessary to seal the connection between the valve, spring, and valve enclosure, such that no gas or fluid can move between the valve and valve enclosure where the spring or tension device is connected to both respectively. In some embodiments, a valve enclosure seal portion is at the base or a distal end of the valve enclosure.

In some embodiments, the apparatus can include one or more valve enclosure seal portions. The valve enclosure seal portions can be configured on the interior of the valve enclosure above and below the second opening of the valve enclosure, and also at the base of the valve enclosure where the tension device is located. Any suitable arrangement of the valve enclosure seal portions and valve seal portions are within the scope of this disclosure. In a preferred embodiment, a valve seal portion exists both immediately above and below the first opening of the first opening of the valve, and a valve enclosure seal portion exists at the base of the valve enclosure preventing a gas or fluid from being transferred through the space between the exterior of the valve and the interior of the valve enclosure, except for through an at least partial overlap of the first and second openings.

In some embodiments, the apparatus is configured such that the oscillation of the chamber volume is performed by an electrical device. In other embodiments, the apparatus is configured such that the oscillation of the chamber volume is performed by a non-electric mechanical device.

In some embodiments, the apparatus can include a device for providing a mechanical advantage for, at least in part, oscillating the chamber volume; wherein the device for providing a mechanical advantage can be, but is not limited to, a gear, lever, or pulley system, or the like.

In some embodiments, the apparatus is configured such that when a first seal portion of the apparatus is coupled to a container or vessel having a finite volume, and when the volume of the chamber is increased and then decreased thereby removing the gas, or fluid, from the container or vessel: a pressure inside the container or vessel will reach a substantially perfect vacuum.

Other systems, apparatus, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention can encompass a variety of forms that can be similar to or different from the embodiments set forth above and below.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7 is a diagram to be used as a key to assist in visualizing FIGS. 3-6.

DETAILED DESCRIPTION

Figure 1:
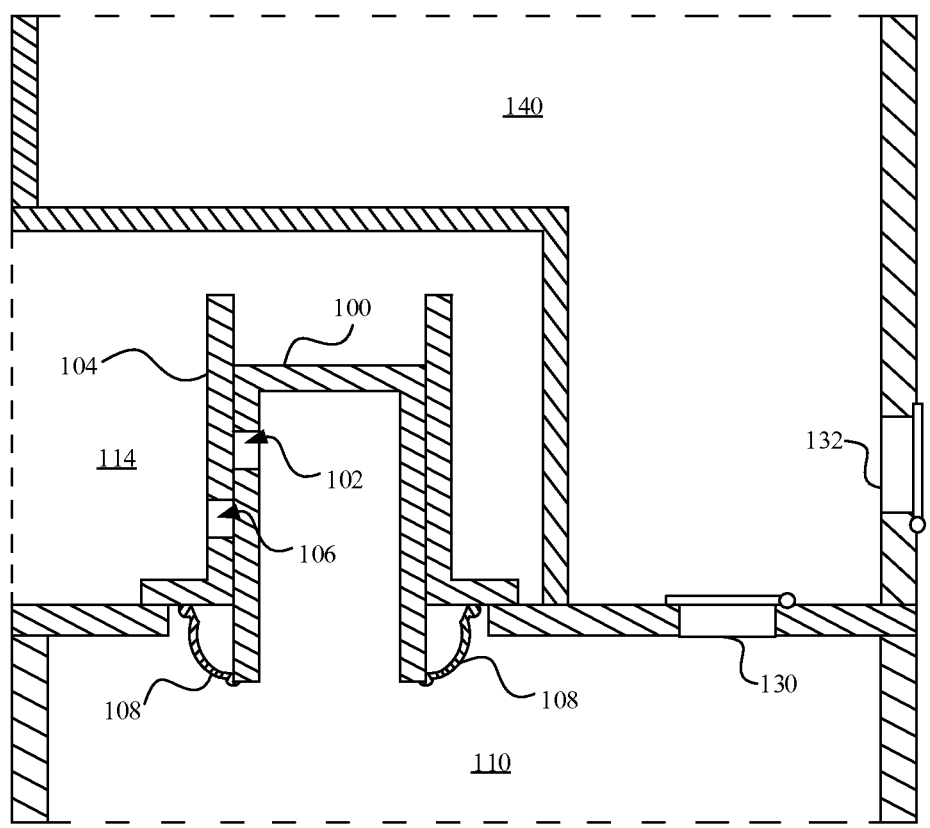
FIG. 1 is a cross-sectional view of an embodiment of the apparatus.

Representative Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which can vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The terms "finite space," "finite volume," "container," and "vessel" are used interchangeably herein to mean simply a vessel, which can have openings that when sealed give the vessel a finite volume. Additionally, the vessel is intended to be structurally capable of withstanding at least some amount of change in pressure.

In a preferred embodiment, the apparatus described herein allows for the repetitive oscillation of pressure in a container. Such oscillation of pressure in the container can be useful for material impregnation. For example, certain materials can be modified or improved by introducing another material such as a liquid into the material. Material impregnation can be accomplished by heating the material in a suitable liquid for a period of time, however, this process can be time consuming, inefficient, and sometimes dangerous. In some embodiments described herein, oscillating pressure in a container is used to impregnate a material without the need of an external source of heat or, in some embodiments, electricity. For example, when a material is submerged in a liquid contained in a container, by oscillating pressure in the container from atmospheric pressure to a substantially perfect vacuum, some liquid molecules are forced to replace air particles in certain materials thereby impregnating the material over the period of oscillation of pressure. The apparatus, methods, and systems described herein can be used to accomplish the oscillation of pressure.

In a preferred embodiment, the apparatus comprises a valve having a first opening, and a valve enclosure having a second opening. The material and liquid are placed in a container. The pressure of the container is caused to decrease, and as a result, water replaces some of the air in the material to some extent. However, upon a further decrease in pressure of the container, and the container reaching substantially perfect vacuum, it may still be desirable for the material to be further impregnated with the liquid. Further impregnation is affected or accomplished by allowing an increase in pressure of the container and subsequently allowing a decrease in pressure again. The force of pressure inside the container will cause the first opening of the apparatus to eventually at least partially overlap the second opening of the apparatus, allowing a gas or fluid to enter the container thereby increasing the pressure in the container. As a result of the increase in pressure of the container, the force of pressure causing the aforementioned overlap decreases, and the first opening and second opening become less proximate to the extent that they no longer at least partially overlap. When the first opening and second opening no longer at least partially overlap, a gas or fluid will no longer be permitted to enter the container, and the pressure in the container can again be allowed to decrease, repeating the aforementioned process of decreasing and increasing (oscillating) pressure in the container. In some embodiments, the operation of the apparatus allows for the container to oscillate multiple times between atmospheric pressure and a substantially perfect vacuum, at which point a fluid or gas in the container would have impregnated the material inside the container. In this manner, various materials and products can be impregnated with a fluid or gas without, in some embodiments, necessarily applying an external source of energy beyond the mechanical force of a human. For example, in certain embodiments where the decrease in pressure of the container is accomplished by a pump or piston being operated by a person or machine wherein the only force that needs to be applied to the crank to oscillate the pressure in the container can be the force of a human hand turning the crank. As a result, one or more turns of the crankshaft cause(s) the volume of a chamber to oscillate, and thus the pressure in the container can incrementally reach a substantially perfect vacuum, or other pressure, in some embodiments. Further, and upon one more additional turns of the crank, the pressure in the container will increase as a result of operation of the apparatus, specifically a gas or fluid entering the container through the at least partial overlap of the first opening and second opening. Further understanding of the apparatuses, methods, and systems will be understood in view of the figures and other embodiments described herein.

FIG. 1 discloses a cross-sectional view of an embodiment of the apparatus which includes a valve 100 having a first opening 102, a valve enclosure 104 having a second opening 106, and a first tension device 108. Also included in FIG. 1 is a space 110, a relief compartment 114, a first check valve 130, a second check valve 132, and a chamber 140.

Figure 2:
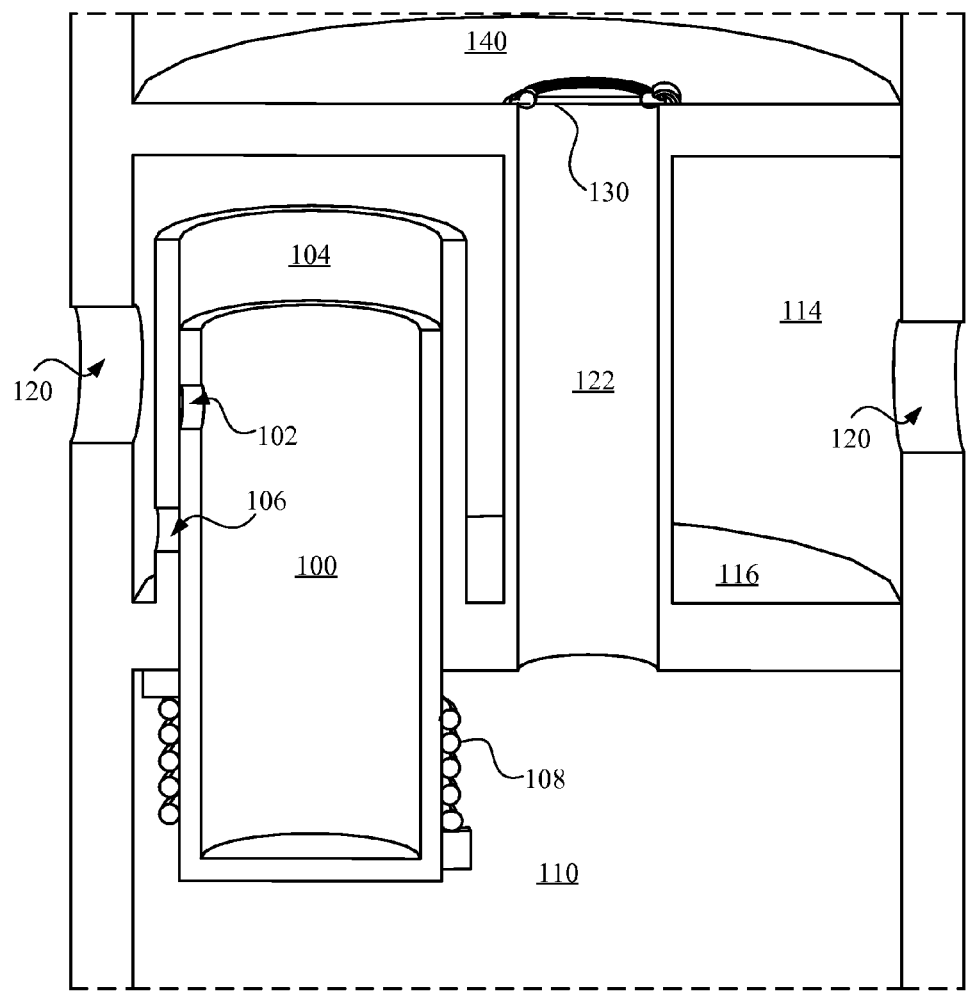
FIG. 2 is a cross-sectional view of an embodiment of the apparatus.

FIG. 2 discloses a cross-sectional view of one embodiment wherein the apparatus includes a valve 100 having a first opening 102, a valve enclosure 104 having a second opening 106, and a first tension device 108. Also included in FIG. 2 is a space 110, a relief compartment 114, a relief compartment base 116, a relief compartment wall 118, at least one relief compartment opening 120, a passage way 122, a first check valve 130, and a partial view of a chamber 140.

Figure 3:
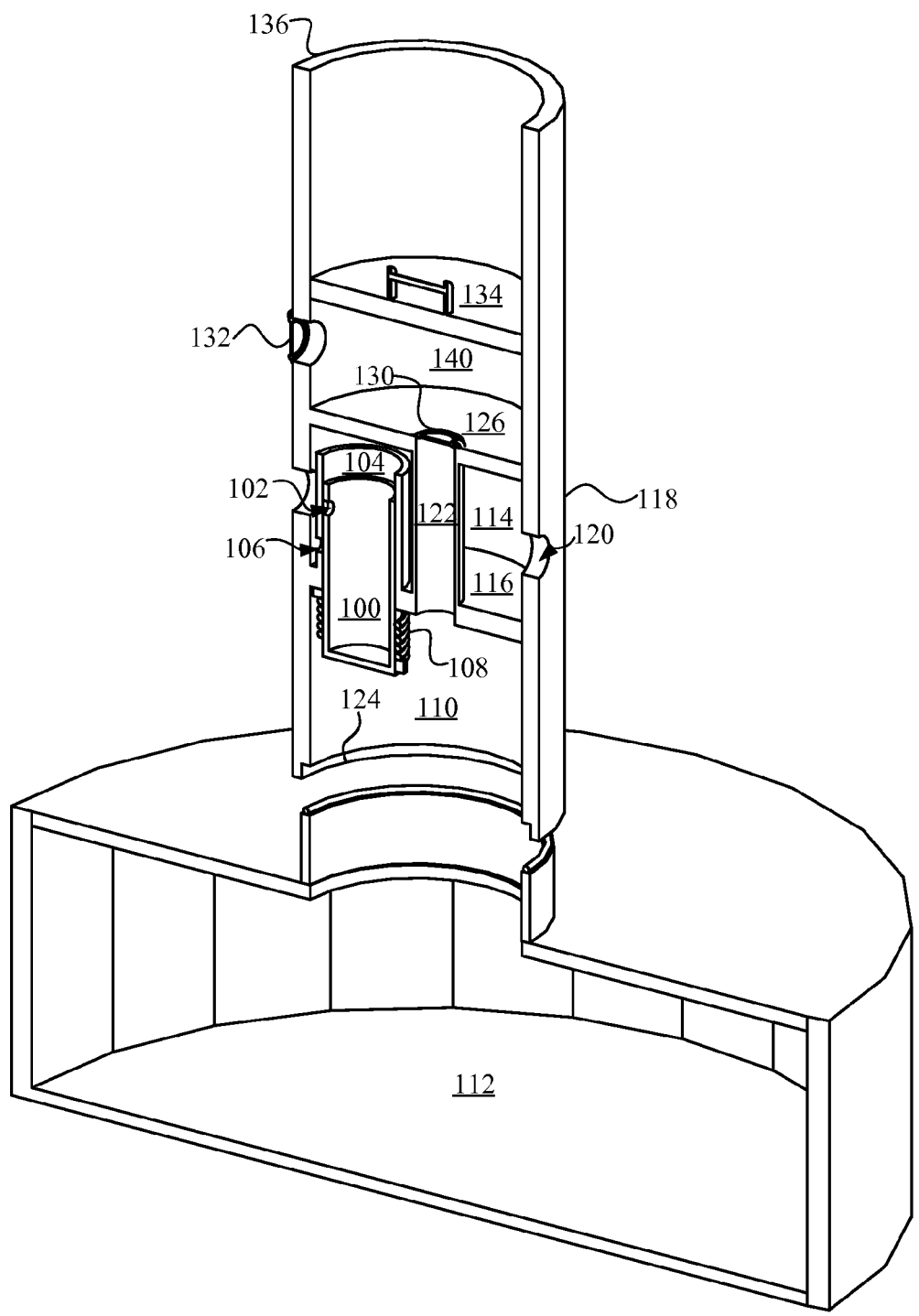
FIG. 3 is a cross-sectional view of an embodiment of the apparatus and a cross-sectional view of a chamber and container for which the apparatus can be attached.
Figure 4:
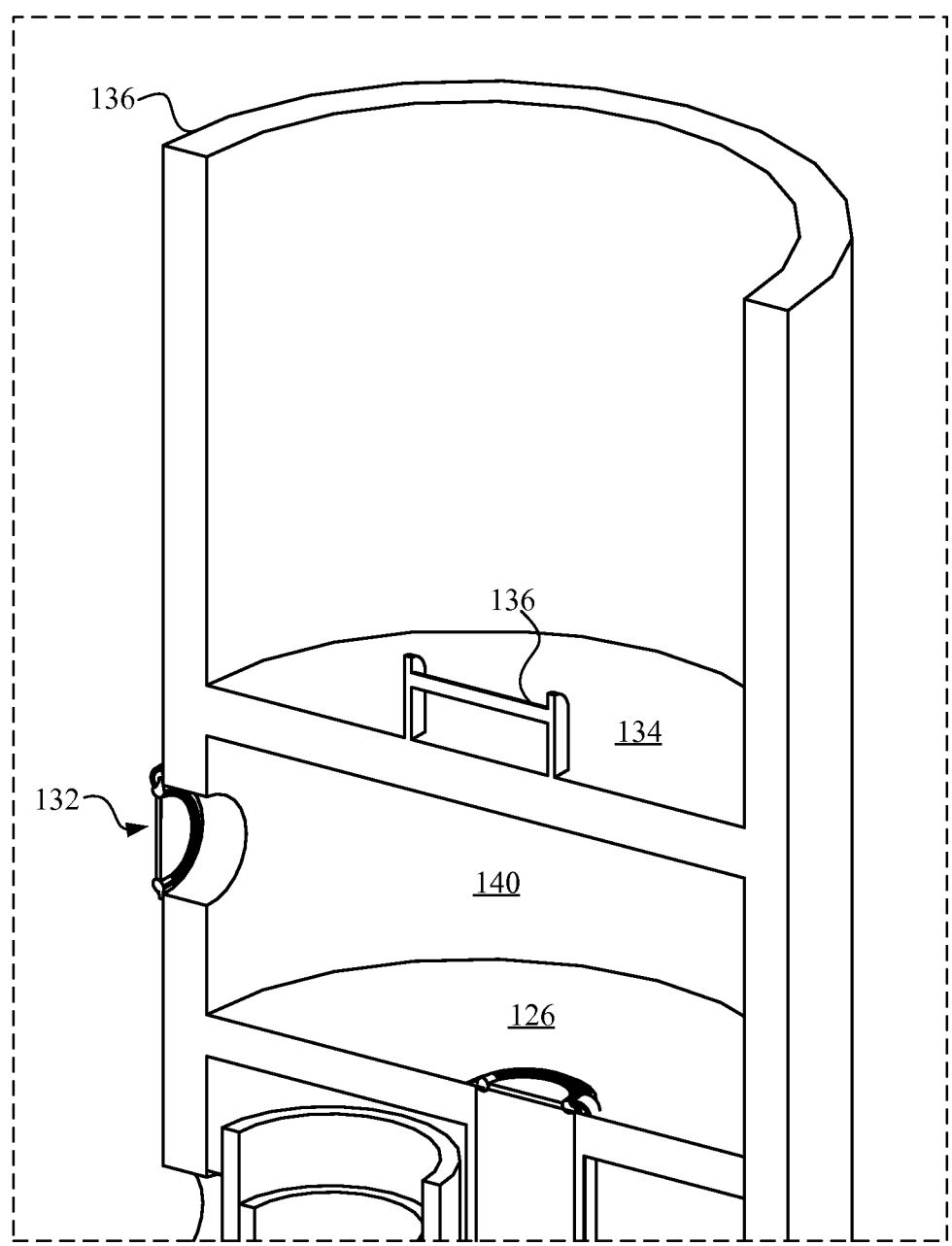
FIG. 4 is a cross-sectional view of an upper portion of the embodiment of the apparatus fully displayed in FIG. 3.

FIG. 3 discloses a cross-sectional view of an another embodiment, wherein the apparatus includes some aforementioned elements of FIG. 2 such as a valve 100 having a first opening 102, a valve enclosure 104 having a second opening 106, and a first tension device 108. Also included in FIG. 4 is a space 110, a cross sectional view of a container 112 or sometimes referred to as a container 112 herein, a relief compartment 114, a relief compartment base 116, a relief compartment wall 118, at least one relief compartment opening 120, a passage way 122, a first check valve 130, and a partial view of a chamber 140. FIG. 4 further includes a full view of the space 110, a first seal portion 124, a full view of the container 112 or sometimes referred to as a container 112 herein, a cross-sectional view of the chamber 140, a first base 126, a second check valve 132, a second base 134, and a second seal portion 136.

FIG. 4 is a cross-sectional view of an upper portion of the embodiment of the apparatus fully displayed in FIG. 3, wherein the apparatus includes, in addition to the aforementioned elements of FIG. 3, a chamber 140, a first base 126, a second check valve 132, a second base 134, a second base attachment 136, and a second seal portion 136.

Figure 5:
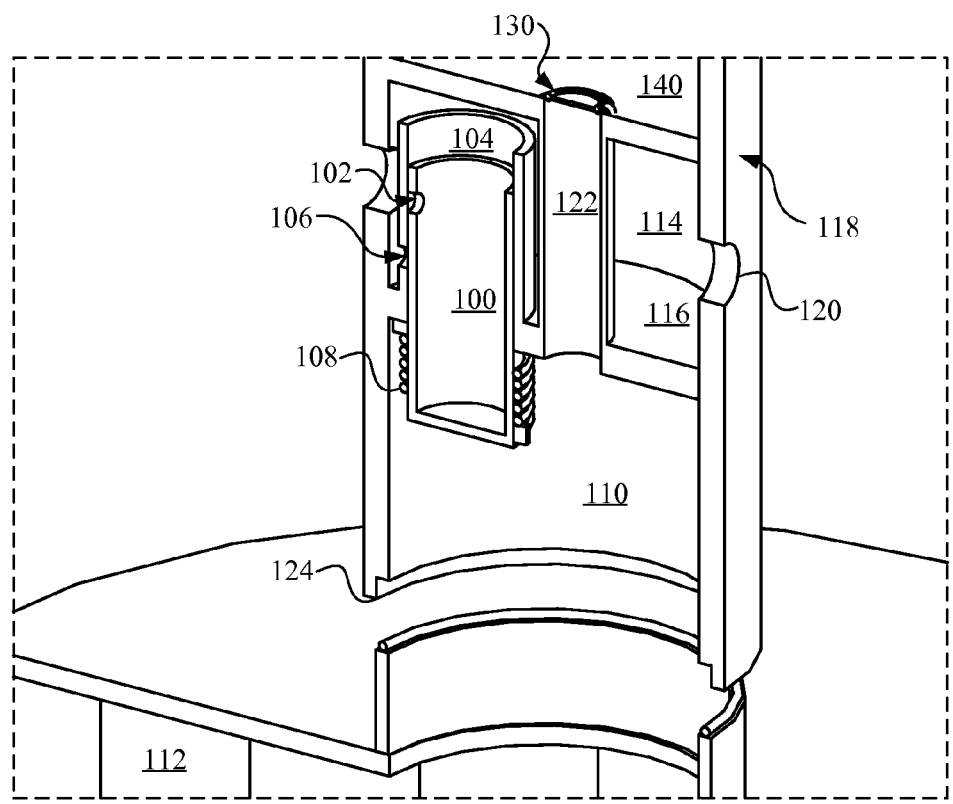
FIG. 5 is a cross-sectional view of a middle portion of the embodiment of the apparatus fully displayed in FIG. 3.

FIG. 5 is a cross-sectional view of a middle portion of the embodiment of the apparatus fully displayed in FIG. 3. The apparatus can include, in addition to the aforementioned elements of FIG. 3, a partial view of the container 112, a partial view of the first seal portion 124, the space 110, the valve 100, the first opening 102, the valve enclosure 104, the second opening 106, the first tension device 108, the relief compartment 114, the relief compartment base 116, the relief compartment wall 118, at least one relief compartment opening 120, the passage way 122, the first check valve 130, and a partial view of a chamber 140.

Figure 6:
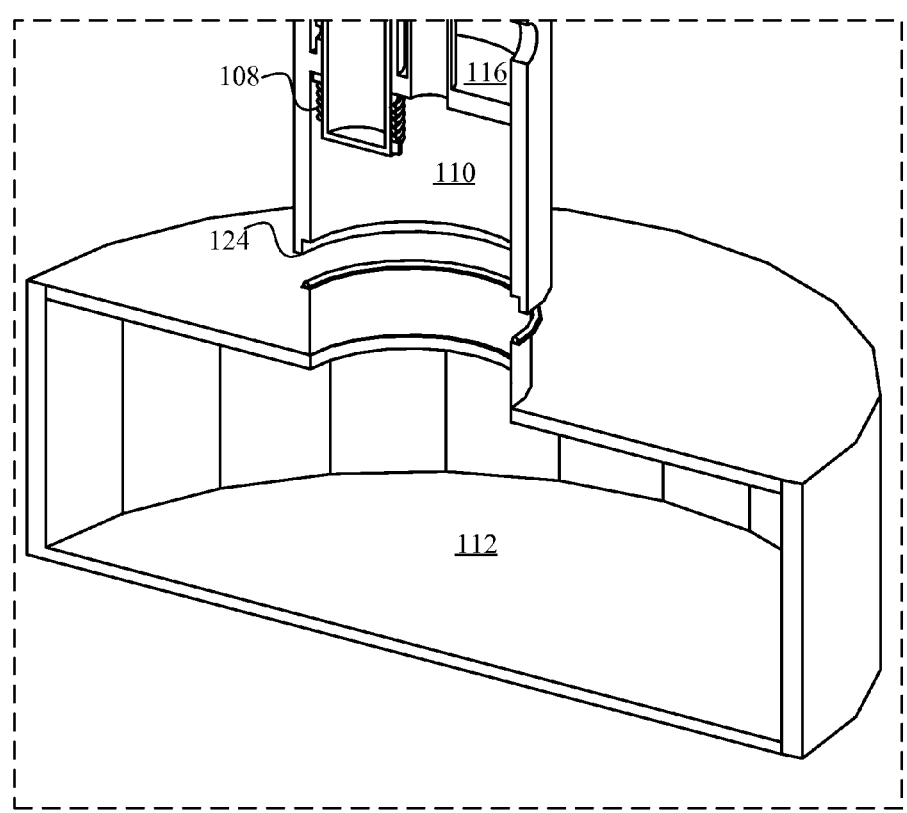
FIG. 6 is a cross-sectional view of a bottom portion of the embodiment of the apparatus fully displayed in FIG. 3.

FIG. 6 is a cross-sectional view of a bottom portion of the embodiment of the apparatus fully displayed in FIG. 3, wherein the apparatus includes, in addition to the aforementioned elements of FIG. 3, a cross-sectional view of the first seal portion 124, the first tension device 108, the relief compartment base 116, and a partial view of the container 112.

FIG. 7 is a diagram to be used as a key to assist in visualizing FIGS. 3-6, which are partial views of the embodiment of the apparatus fully displayed in FIG. 3. FIG. 4 details the layout of FIG. 3 wherein FIG. 4 is the top portion of FIG. 3, FIG. 5 is the middle portion of FIG. 3, and FIG. 35 is the bottom portion of FIG. 3.

Figure 8:
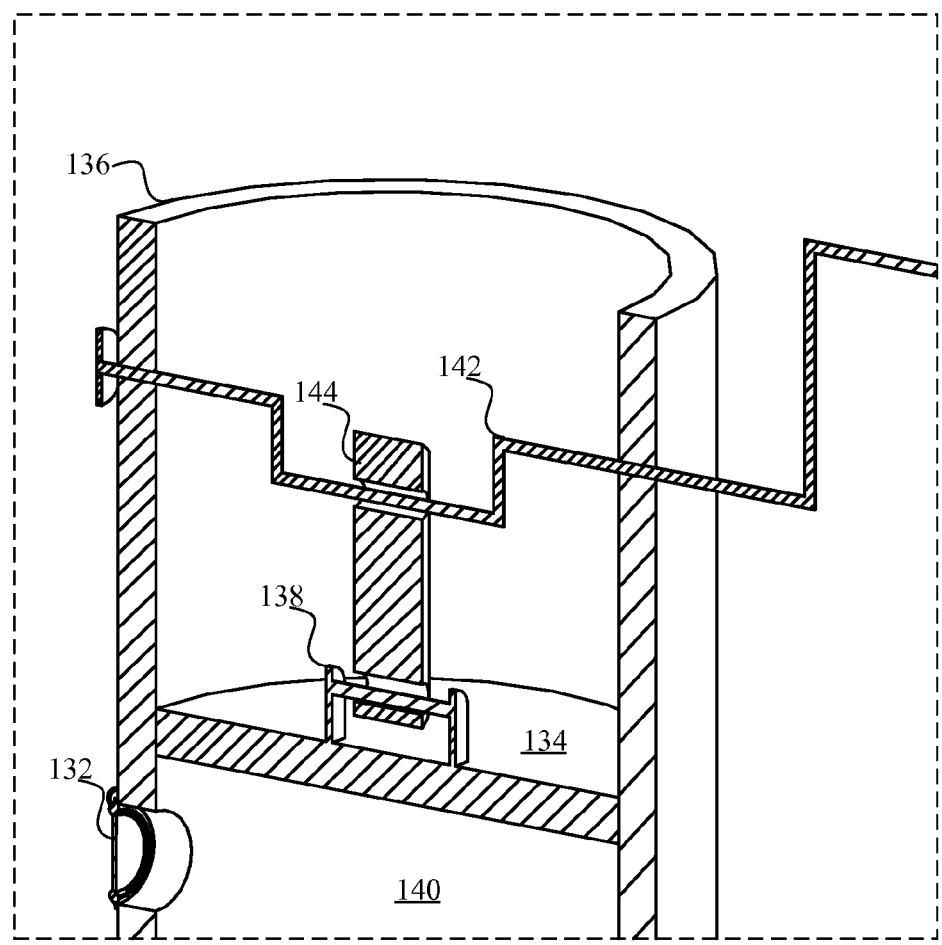
FIG. 8 is a cross-sectional view of an upper portion of the embodiment of the apparatus as fully displayed in FIG. 3 but including a crank and crank attachment.

FIG. 8 is a cross-sectional view of an upper portion of an embodiment of the apparatus as fully displayed in FIG. 3, wherein the apparatus includes, in addition to the aforementioned elements of FIG. 3, a crank 142, crank attachment 144, a chamber 140, a second check valve 132, a second base 134, a second base attachment 136, and a second seal portion 136.

Figure 9A:
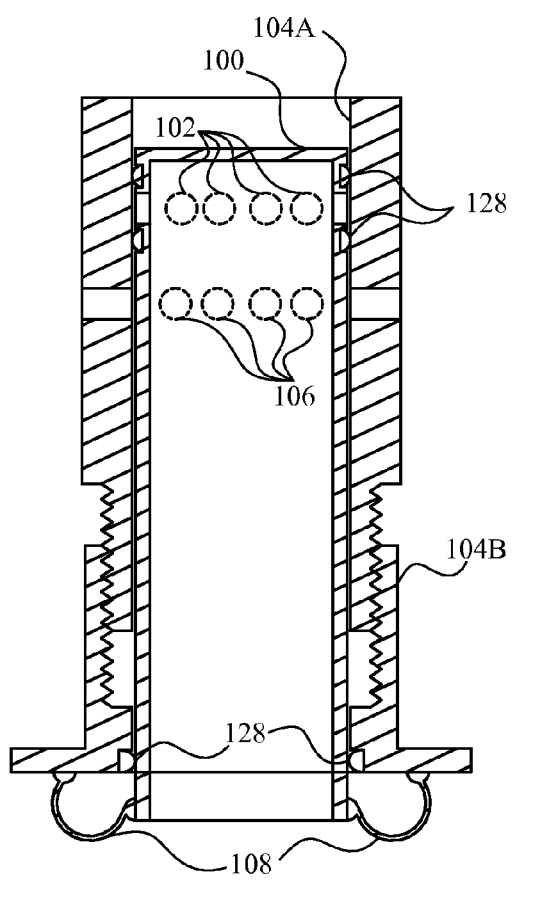
FIG. 9A is a cross-sectional view of an embodiment of the apparatus.
Figure 9B:
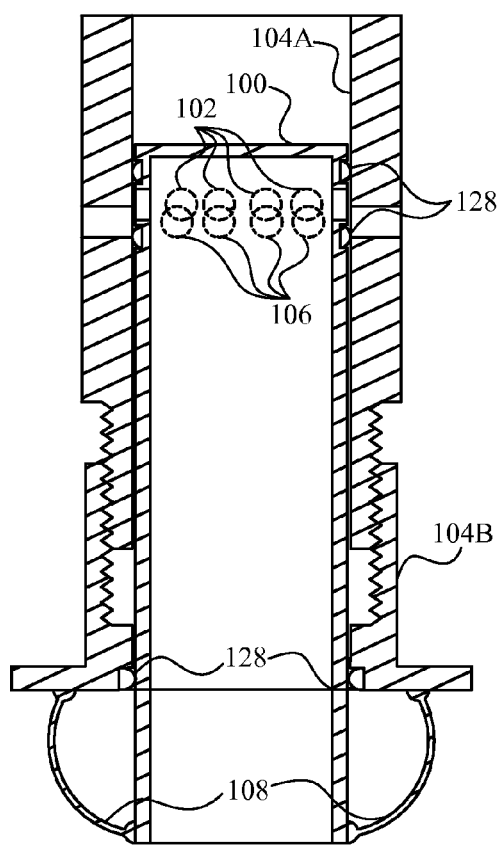
FIG. 9B is a cross-sectional view of an embodiment of the apparatus

FIGS. 9A and 9B are cross-sectional views of an embodiment of the apparatus wherein the apparatus includes a valve 100 having one or more first openings 102, a first enclosure portion 104A, a second enclosure portion 104B, one or more second openings 106 of the valve enclosure 104A, one or more valve seals 128, and a first tension device 108. FIG. 9A is intended to show an embodiment of the apparatus at rest, while FIG. 9B is intended to show an embodiment of the apparatus not at rest or being acted on by an external force, for example, pressure, which is forcing the valve 100 out of the valve enclosure portions 104A and 104B, and stretching the first tension device 108.

Figure 10:
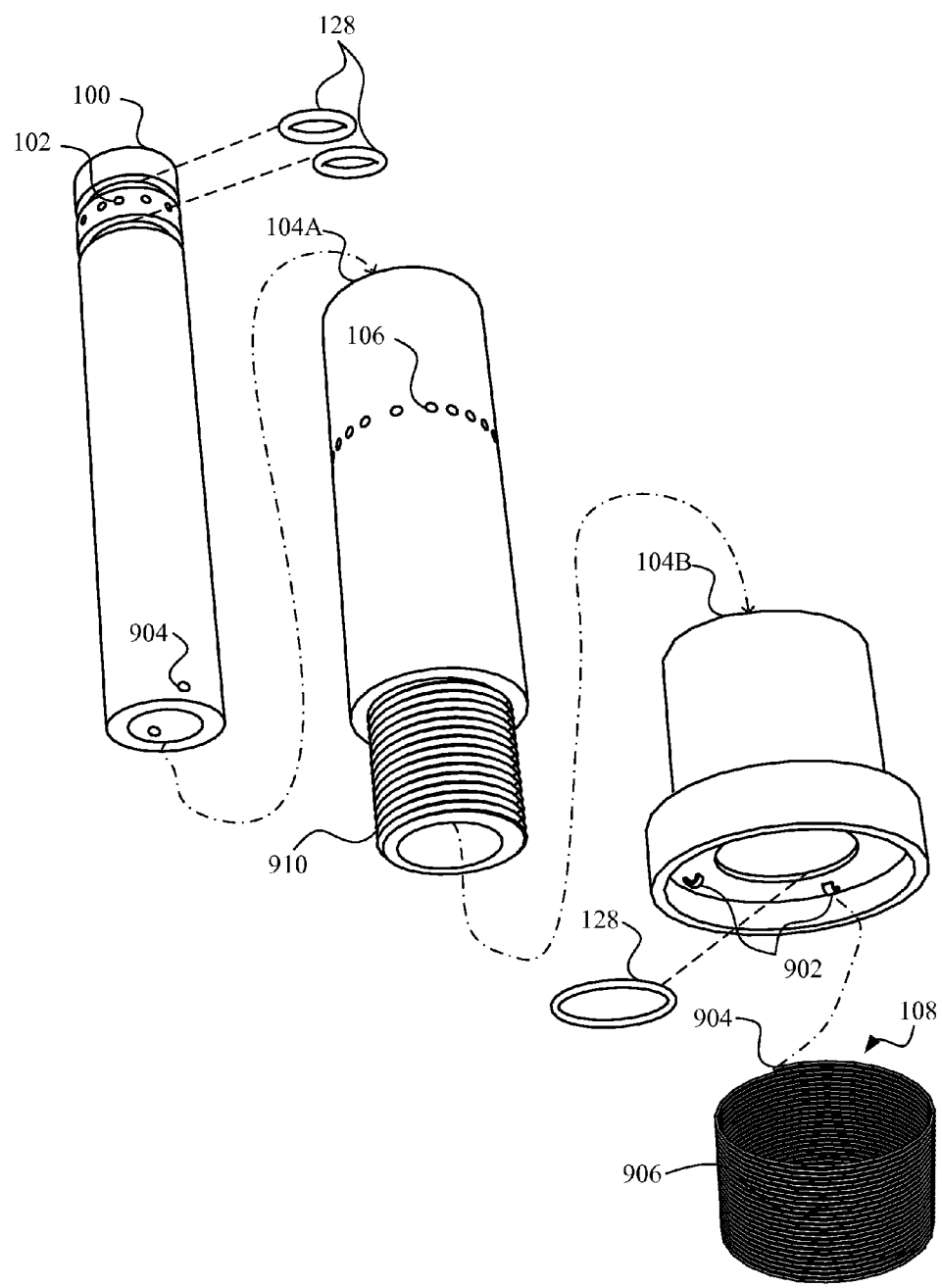
FIG. 10 illustrates an exploded view of an embodiment of the apparatus.

FIG. 10 illustrates an exploded view of an embodiment of the apparatus. Specifically, FIG. 10 illustrates a valve 100 that can be set inside of the first enclosure portion 104A. The vale 100 can include seals 128 that can be set above and/or below the first openings 102. The first enclosure portion 104A can include one or more second openings 106, and can include a threaded portion 910. The first enclosure portion 104A can be coupled to the second enclosure portion 104B, for example, by way of screwing the first enclosure portion 104A into the second enclosure portion 104B. In this way, the displacement of the first openings 102 with respect to the second openings 106 can be adjusted. Once the first enclosure portion 104A and the second enclosure portion 104B are coupled, the valve 100 can be set inside of the first enclosure portion 104A. A seal 128 can be set inside of the second enclosure portion 104B in order to seal the inside surface of the second enclosure portion 104B and an outside of the valve 100. A tensions device 108, such as a spring, can be connected to the second seal portion 104B through any suitable method such as mechanical coupling, adhesive, bonding, or placing a first end 904 of the tension device 108 through one or more hooks 902 the second enclosure portion 104B. A second end 906 of the tension device 108 can be coupled to the valve 100 through any suitable method such as mechanical coupling, adhesive, bonding, or placing the second end 906 through one or more valve apertures 904.

It should be noted that the parts discussed herein with respect to the apparatus and/or valve can be scaled to any suitable size. In some embodiments, the apparatus can be used as a medical device for implementations using changes in pressure. For example, the lungs or heart are examples of organs that frequently experience changes in pressure and can therefore include valves in order to assist and manage pressure changes. Therefore, any of the embodiments discussed herein can be used in combination with an organ or other medical device in order to accomplish certain medical tasks.

It is contemplated that the systems, devices, methods, and processes of the claimed invention encompass variations and adaptations developed using information from the embodiments described herein. Adaptation and/or modification of the systems, devices, methods, and processes described herein can be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions can be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

In some embodiments, the apparatus includes a valve 100 having a first opening 102, a valve enclosure 104 having a second opening 106, and a first tension device 108. In FIG. 1, the apparatus is operatively coupled to a system comprising a space 110 or a finite space 110, a relief compartment 114, a first check valve 130, and a second check valve 132, and a chamber 140. The apparatus and the system are configured such that when the pressure in the chamber 140 decreases to a value below the value for pressure in the space 110, a gas or fluid moves from the space 110 through the first check valve 130. An increase in volume of the chamber 140 can also cause a gas or fluid to move from the space 110 through the first check valve 130. As a result, and if the decrease in pressure of the space 110 is enough to overcome a force of tension of the first tension device 108, the valve 100 will move in such a way to cause the first opening 102 to become more proximate to the second opening 106. The gas or fluid displaced from the space 110 into the chamber 140 can be ejected from the chamber through the second check valve 132 when the pressure in the chamber 140 is increased or the volume of the chamber 140 is decreased. If the aforementioned operations, or additional repetitions of the aforementioned operations, cause a decrease in pressure of the space 110 that forces the first opening 102 to at least partially overlap a second opening 106, a gas or fluid from the relief compartment 114 will enter the space 110 through the at least partial overlap of the first opening 102 and the second opening 106. As a result of the aforementioned operation or repetitions of the aforementioned steps, the space 110 will oscillate between two different pressures. In some embodiment the two different pressures are atmospheric pressure and substantially perfect vacuum.

In certain embodiments, that apparatus comprises a valve 100 having a first opening 102, a valve enclosure 104 having a second opening 106, and a first tension device 108. The first opening 102 and second opening 106 in one embodiment are located in a space having atmospheric pressure, or at least a pressure that is greater than, or at times equal to, the pressure of a container 112, vessel 112, or finite space 112 for which the apparatus is being applied. The apparatus is configured such that when the pressure of the finite space 112 is reduced to the point of overcoming the force of the first tension device 108, the first opening 102 and second opening 106 eventually at least partially overlap allowing a gas or fluid to enter the finite space 112 through the overlapping first opening 102 and second opening 106. As a result of the pressure in the finite space 112 or vessel 112 increasing, the force of the first tension device 108 automatically forces the valve 100 to move in a direction that makes the first opening 102 and second opening 106 less proximate. Upon the pressure in the finite space 112 decreasing again, the aforementioned process will repeat, thereby allowing the pressure of the finite space 112 to oscillate without needing to stop or manually reset the apparatus.

In certain embodiments, the apparatus further comprises a chamber 140 having an adjustable volume. The volume of the chamber 140 can be adjustable by a mechanical device, a pneumatic device, a powered or fueled device, a non-electric device, or part of an electric or pneumatic control system. In an example of an embodiment where the volume of the chamber 140 is adjustable by a mechanical device, the mechanical device can be a piston. The piston at least comprises a cylinder, piston rod, and crankshaft. The motion of the cylinder can occur by motion of the operator's hand turning a handle portion attached to a crankshaft. The mechanical device can incorporate a device to create a mechanical advantage so that the oscillation of volume of the chamber 140 can occur with less application of force but over an extended period of time. For example, a gear or gears can be operatively coupled to the crankshaft or piston rod to distribute the force required to turn the crankshaft and ultimately oscillate and move the piston cylinder.

An embodiment incorporating a mechanical device is in FIG. 8, which shows a crank 142 and crank attachment 144. By turning the crank 142 in either a clockwise or counter clockwise direction, the crank 142 pushes or pulls on the crank attachment 144 which thus pushes or pulls on both the second base attachment 136 and second base 134. Therefore through operation of the crank 142, mechanically, electrically, pneumatically, or other means of turning a crank, the chamber 140 volume can be altered to operate the apparatus in some embodiments described herein.

In certain embodiments the apparatus comprises a first check valve 130 and second check valve 132. In the present disclosure a check valve is any device that only permits the flow of an air, gas, fluid, or liquid in one direction through the device, and should not be limited to the pictorial representation of a check valve in the figures as they are merely symbols indicating direction of gas or fluid flow.

In certain embodiments the apparatus comprises a valve 100 having a first opening 102, and a valve enclosure 104 having a second opening 106. The apparatus can have more than one first opening 102, and/or more than one second opening 106. Additionally, the sizes, shapes, dimensions, and quantities of the first openings 102 and second openings 104 can vary as desired to accommodate a desired outcome for the operation of the apparatus.

In certain embodiments the apparatus comprises a first tension device 108. The first tension device 108 can be a spring, elastic device, adjustable tension device, or other attachment that provides tension while also preventing the first opening 102 and second opening 106 from at least partially overlapping when then first tension device 108 is not being acted on by some other external force (for an example, see FIG. 2). The first tension device 108 can have a set amount of tension or resistance, or the first tension device 108 can have an adjustable amount of tension or resistance. The first tension device 108 can be designed such that the rate at which the first opening 102 and/or the second opening 106 become more or less proximate is adjustable, such that when the first opening 102 and second opening 106 are at least partially overlapping the time over which they return to a non-overlapping configuration can be shortened or extended. The first tension device 108 can be configured to be directly connected to the valve 100 and valve enclosure 104, for example as displayed in FIG. 1. Additionally, the first tension device 108 can be indirectly to the valve 100 and valve enclosure 104, for example as displayed in FIG. 5 wherein the first tension device 108 is connected to the compartment base 116 which is connected to the valve enclosure 104.

In certain embodiments the apparatus comprises a first tension device 108 having an adjustable amount of tension. For example, the first tension device 108 can be a spring. The spring would have a length and a diameter. The first tension device 108 would also comprise two threaded portions: a first threaded valve portion and a second threaded valve portion. The spring or other tension device would be connected to and between the first threaded valve portion and second threaded valve portion such that turning one of the threaded valve portions would compress or decompress the spring or other tension device. The valve 100 would be connected to the spring at a location other than the ends of the spring or other tension device, such as at a midpoint of the spring's length or other tension device's length. In this way, when the spring or other tension device is decompressed by adjusting the first or second threaded valve portions, the force required to move the valve 100 would be increased. Similarly, when the spring or other tension device is compressed by adjusting the first or second threaded valve portions, the force required to move the valve would be decreased.

In certain embodiments the valve enclosure 104 is adjustable to alter the proximity of the second opening to the first opening. For example, the valve enclosure 104 can be part of a threaded device wherein turning the valve enclosure 104 or threaded device alters the proximity of the second opening 106 to the first opening 102, as further described herein.

In certain embodiments the wherein apparatus is powered, the apparatus comprises a valve 100 having a first opening 102, and a valve enclosure 104 having a second opening 106, wherein the motion of the valve 100 is controlled by a device powered by electricity, fuel, or a pneumatic system. The powered device can be a motor, solenoid, or other device capable of affecting the motions of the first opening 102 and/or the second opening 104 towards and away from each other, directly or indirectly. In this or other embodiments the powered device can control the motion of a crank 142. The powered device, can be controlled by a control system having a sensor or variety of sensors to measure parameters that contribute to the operation of the apparatus, in or near a portion or portions of the apparatus, such as but not limited to pressure, temperature, humidity, volume, weight, tension, force, and the like. The sensor or sensors can deliver signals to a programmable controller so that the controller can determine when the controller will perform at least one of increasing or decreasing the volume of the chamber 140, moving the first opening and/or second opening 106 at various rates, times and distances, increasing or decreasing the pressure of the container 112, or adjusting other parts of the apparatus 90 in any of the embodiments described herein. Such control decisions can be governed by feedback from the sensors, for example, the valve 100 can be moved downward by a powered device when the container 112 reaches a substantially perfect vacuum or other pressure value, and the valve 100 can be kept in a position such that the first opening 102 and second opening 106 at least partially overlap until a pressure sensor for the container 112 indicates to the control system that the container 112 has reached atmospheric pressure inside of the container 112, at which point the control can direct the valve 100 to move from its position and prevent the first opening 102 and second opening 106 from at least partially overlapping.

In certain embodiments where the powered device controls the motion of the crank 142 of the apparatus, the powered device can be controlled by a timer. In such an embodiment, a user would set the timer of the device (i.e. to one minute), which would govern the time period over which the pressure of the container 112 would be permitted to oscillate. For example, in certain embodiments, a user could place a desired food to be impregnated into the container (e.g., rice) with a fluid to impregnate the food (e.g., water), turn on the device (whether it is plugged into a power source or being supplied power by an internal device), and set the timer. The timer would then run for the set amount of time, during which the apparatus or device would force the container 112 to oscillate pressure (i.e. between atmospheric pressure and a vacuum pressure). Depending on the food or material to be impregnated, the amount of time for a set of oscillations can be 5 minutes, or the user may wish to adjust the timer to increase or decrease the amount of time over which the container 112 would complete a set of oscillations in pressure. Moreover, the device may just be left on by the user without the timer and subsequently turn off the device when the user desires.

In some embodiments, the apparatus allows for the repetitive oscillation of pressure in a container 112. Such oscillation of pressure in a container 112 can be useful for material impregnation. A simple example of material impregnation is cooking rice. When cooking rice, the rice initially is a dry food, but once the rice is cooked the rice will have become impregnated by some amount of water being used to cook the rice. When most people cook rice, they apply heat to a water and rice combination for a period of time. However, the impregnation of rice, among other materials, can also be accomplished by oscillating pressure in a container wherein the rice and water (or other material or other fluid) has been placed, without the need of an oven burner or external source of heat. For example, by oscillating pressure in the container from atmospheric pressure to a substantially perfect vacuum, water molecules are in part forced to replace air in the rice thereby impregnating the rice over the period of oscillation. In order to improve the efficiency of the process of impregnation in all examples described herein, the apparatus described herein can be used to accomplish the oscillation of pressure. To describe the operation of the apparatus in the example wherein rice is impregnated, the apparatus comprises a valve 100 having a first opening 102, and a valve enclosure 104 having a second opening 106. The rice and water is placed in a container 112. The pressure of the container 112 is caused to decrease, and as a result, water replaces some of the air in the rice to some extent. However, upon further decrease in pressure of the container 112, and the container 112 reaching substantially perfect vacuum, a person can still desire the rice, or whatever material can be inside the container 112, to be further impregnated with water, or some other fluid.

Further impregnation is affected by allowing an increase in pressure of the container 112 through operation of the apparatus described herein, in any of the embodiments described herein. The force of pressure inside the container 112 will cause the first opening 102 of the apparatus to eventually at least partially overlap the second opening 106 of the apparatus (as shown in FIG. 9B), allowing a gas or fluid to enter the container 112 thereby increasing the pressure in the container 112. As a result of the increase in pressure of the container 112, the force of pressure causing the aforementioned overlap decreases, and the first opening 102 and second opening 106 become less proximate to the extent that they no longer at least partially overlap (as shown in FIG. 9A). When the first opening 102 and second opening 106 no longer at least partially overlap, a gas or fluid will no longer be permitted to enter the container 112, and the pressure in the container 112 can again be allowed to decrease, repeating the aforementioned process of decreasing and increasing (oscillating) pressure in the container 112. In some embodiments, the operation of the apparatus allows for the container 112 to oscillate multiple times between atmospheric pressure and a substantially perfect vacuum, at which point the fluid or gas in the container 112 would have impregnated the material inside the container 112, whether the material be a natural or unnaturally occurring material. In this manner, various materials and products can be impregnated with a fluid or gas without necessarily applying an external source of energy beyond the mechanical force of a human. For example, in certain embodiments where the decrease in pressure of the container 112 is accomplished by a piston being operated by a human turning the crank 142 of FIG. 8, the only force that needs to be applied to the crank 142 to oscillate the pressure in the container 112 can be the force of a human hand turning the crank 142. As a result, one or more turns of the crankshaft cause(s) the volume of a chamber 140 to oscillate, and thus the pressure in the container 112 can incrementally reach a substantially perfect vacuum, or other pressure, in some embodiments. Further, and upon one more additional turns of the crank 142, the pressure in the container 112 will increase as a result of operation of the apparatus, specifically a gas or fluid entering the container 112 through the at least partial overlap of the first opening 102 and second opening 106.

In certain embodiments wherein the force of tension of the first tension device is adjustable, the amount of pressure between which the apparatus will permit the container 112 to oscillate between will depend on the adjustment to the force of tension of the first tension device or the adjustment of the valve enclosure. In certain embodiments wherein the valve enclosure is adjustable to alter the proximity of the first opening 102 to the second opening 106, the amount of pressure between which the apparatus will permit the container 112 to oscillate between will depend on the adjustment to the valve enclosure that alters the proximity of the first opening 102 to the 106 second opening. For example, the valve enclosure 104 can comprise at least two portions: a first enclosure portion 104A and a second enclosure portion 104B (as shown in FIGS. 9A and 9B), wherein the first enclosure portion 104A comprises the second opening 106 or multiple second openings 106, and a second enclosure portion 104B does not have an opening. In this example, by turning the first enclosure portion 104A counter clockwise the plurality of second openings 106 (see FIG. 9A) will move closer to the plurality of first openings 102 (see FIG. 9A), and by turning the first enclosure portion 104B clockwise the plurality of second openings 106 will move further from the plurality of first openings 102. The adjustment of proximity of the proximity of the first openings 102 and the second openings 106 is beneficial when a certain material can be volatile and therefore may not hold up under certain pressures (e.g., in certain implementation related to food, medical, or chemical processing). For example, when impregnating a food product, if the container for which the food product is placed undergoes a change in pressure from atmospheric pressure to a substantially perfect vacuum, then at least some portion of the food product may be destroyed because of the extremely low pressure in the container. Therefore, by allowing the first opening 102 and the second openings 106 to at least partially overlap before the container reaches a substantially perfect vacuum or other undesirable pressure, the food product or other material in the container may not be entirely damaged or overly impregnated with a fluid by the change in pressure.

The apparatus described herein can be used in a variety of applications. The apparatus can be used in place of high temperature operations in order to impregnate a variety of materials. Other materials for which the apparatus can be used to impregnate are not limited to common items such as coffee, spaghetti, meat, various plants such as cucumbers and apples, fruits, vegetables, grains, and the wood from trees, and synthetic materials such as cloth, paper, powders, porous solids, and plastics. In general, any material where space for additional air or fluid exists between the molecules defining the material. For example, often times when mixing a dry powder with liquid in a container, clumps form, which comprise powder and air. By oscillating pressure in the container between atmospheric pressure and a substantially perfect vacuum, the air inside the clumps will be forced to exit the container and liquid will be forced to enter the clumps to replace the air, thereby eliminating the clumps and making the mixture of powder and liquid uniform and smooth.

In some embodiments where the apparatus is controlled electronically, the apparatus can comprise hardware, software, firmware, or a combination thereof, as necessitated by the embodiment. For example, the apparatus can comprise a controller of a control system. The controller can be a computer connected directly, indirectly, or wirelessly to a processor and memory having software stored on a non-transitory computer readable storage medium to operate the control system and apparatus in some of the embodiments described herein. In certain embodiments, the apparatus is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the apparatus is implemented in software or firmware that is stored in a memory and that is executed by a suitable instruction execution system.

Although some embodiments have been shown and described, it will be clear to those of ordinary skill in the art that a number of changes, modifications, or alterations to the disclosure as described can be made. For example, the apparatus, or individual elements of the apparatus in every embodiment, can be scaled to meet the demands of various operations such as but not limited to residential and industrial operations. The materials for which the apparatus is comprised can be altered so long as the apparatus still functions to allow for the oscillation of pressure in a container 112 to meet the demands of a given operation. For example, impregnating a synthetic material can require more stress on the system or apparatus than impregnating spaghetti or coffee beans or grounds, therefore the system or apparatus should be made of more durable materials if more stress is to be expected to be applied to the apparatus during operation of the apparatus. Additionally, the size of the apparatus in the embodiments described herein can be scaled for various operations such as home use (a small batch operation) or industrial use (a large batch operation). For example, in certain embodiments the container 112 could be very small (i.e. a half liter) or very large (i.e. 25 gallons). Moreover, the system or apparatus can be designed for permanence in a location or for easy transport, thus it can be desirable to make the system or apparatus easy to break down and store for transport. All changes, modifications, and alterations should therefore be seen as within the scope of the disclosure.

What is claimed is:

1. An apparatus, comprising:
   a valve having a first opening;
   a valve enclosure comprising a second opening; and
   a tension device configured to displace the first opening of the valve away from the second opening of the valve enclosure unless a force acting on the apparatus overcomes a force of the tension device and causes the first opening to be more proximate to the second opening, wherein the valve enclosure comprises a threaded portion, a first enclosure portion, and a second enclosure portion such that the valve enclosure is adjustable, via the threaded portion, to alter a proximity of the first opening and the second opening.

2. The apparatus of claim 1, wherein the apparatus further comprises:
   a valve seal assembly configured to seal at least a portion of an area above and below the first opening relative to end of the valve enclosure, wherein the valve seal assembly is configured such that unless the first opening and the second opening are at least partially overlapping, the valve seal assembly prevents a gas or fluid from moving through the first opening and the second opening.

3. The apparatus of claim 1, wherein the apparatus further comprises:
   a valve seal assembly, configured such that unless the first opening and second opening are at least partially overlapping, the valve seal assembly is configured to prevent a gas or fluid from moving through the first opening and second opening by:
      sealing at least a portion of an area above and below the first opening relative to an end of the valve enclosure, and
      sealing at least a portion of the area of the valve enclosure below both the first opening of the valve and the second opening of the valve enclosure relative to the end of the valve enclosure.

4. The apparatus of claim 3, wherein the apparatus is configured such that:
   an oscillation of volume of the chamber causes: i) a pressure oscillation in the container, ii) the first opening and second opening to at least partially overlap, and iii) the pressure of the container to decrease and subsequently increase as a result of the overlap.

5. The apparatus of claim 1, wherein the apparatus further comprises:
   a chamber having an adjustable volume;
   a first check valve; and
   a second check valve, wherein the apparatus is configured such that when the apparatus is directly or indirectly mechanically coupled to a container:
      an increase in a volume of the chamber causes a decrease of pressure in the container;
      an increase in a volume of the chamber causes a gas, or fluid, to enter the chamber through the first check valve;
      a decrease in the volume of the chamber piston assembly causes a gas, or fluid, to exit the chamber and move through the second check valve; and
      the first opening and second opening become more proximate as the pressure of the container decreases.

6. The apparatus of claim 5, wherein:
an oscillation of volume in the chamber is performed by an electrical device.

7. The apparatus of claim 5, wherein:
an oscillation of volume in the chamber is performed by a non-electric mechanical device.

8. The apparatus of claim 5, wherein:
a device for providing a mechanical advantage performs, at least in part, assists in the oscillation of the volume in the chamber.

9. The apparatus of claim 5, wherein:
the pressure inside the container decreases in increments of pressure change, wherein the apparatus is configured such that:
  a decrease in volume of the chamber does not cause a change of pressure in the container, unless, concurrently, the first and second openings are at least partially overlapping thereby increasing the pressure in the container to atmospheric pressure;
  an increase in volume of the chamber causes a change of pressure in the container; and
  the change of pressure in the container is caused by the increase in volume of the chamber, unless the first and second openings are at least partially overlapping.

10. The apparatus of claim 5, wherein:
the apparatus is configured such that:
  as a result of the pressure of the container decreasing, the first opening and second opening at least partially overlap to allow a gas, or fluid, to enter the space concurrently through the first opening and second opening.

11. The apparatus of claim 1, wherein the apparatus further comprises:
a first seal portion, for sealing a region between the apparatus and a container to which the apparatus is configured to abut.

12. The apparatus of claim 1, wherein:
the apparatus is configured such that:
  the proximity of the first opening and second opening is determined in part by the force of the tension device; and
  when the apparatus is operatively coupled to a container:
    the first opening and second opening become more proximate when a decrease in pressure of the container overcomes the force of the tension device.

13. The apparatus of claim 1, further comprising a container, and the force of the tension device is adjustable such that amount of pressure of the container required to overcome the force of the tension device is increased or decreased by adjustment of the tension device.

14. The apparatus of claim 1, wherein the tension device is a spring, elastic material, or flexible material.

15. The apparatus of claim 1, further comprising:
a first seal portion;
a chamber having an adjustable volume;
a first check valve;
a second check valve, wherein the apparatus is configured such that:
  when a first seal portion of the apparatus is abuts a container and a volume of a chamber is increased thereby removing the gas or fluid from the container or vessel through the first check valve:
    a pressure inside the container approaches a substantially perfect vacuum.

16. A method, comprising:
decreasing pressure in a container that is attached to a valve apparatus, the valve apparatus comprising valve having a first opening, a valve enclosure having a second opening, and a tension device,
  wherein the valve enclosure includes a threaded portion, a first enclosure portion, and a second enclosure portion such that the valve enclosure is adjustable, via the threaded portion, to alter a proximity of the first opening and the second opening;
causing the first opening and the second opening of the valve apparatus to become more proximate as a result of the decreasing pressure;
causing a gas or fluid to enter the container as a result of the first opening and the second opening becoming more proximate, wherein the gas or fluid enters the container through an opening created by at least a partial overlapping of the first opening and the second opening;
causing the pressure in the container to increase as a result of the gas or fluid entering the container; and
causing the first opening and the second opening to become less proximate as a result of the pressure of the container increasing.

17. The method of claim 16, wherein the decrease in pressure overcomes a force of tension of a tension device of the valve apparatus thereby making the first opening and second opening more proximate.

18. A system, comprising:
a container; and
a valve, the valve comprising:
  a first opening, and
  a second opening, wherein the valve is configured such that:
    a proximity of the first opening to the second opening is based in part on an amount of pressure inside the container; and
    the first opening and second opening become more proximate when a pressure in the container decreases,
      wherein the valve further comprises a threaded portion, a first enclosure portion, and a second enclosure portion such that the valve is adjustable, via the threaded portion, to alter a proximity of the first opening and the second opening.

19. The system of claim 18, further comprising:
a seal between the valve and the container.

20. The system of claim 18, wherein the first opening is included on a first enclosure and the second opening is included on a second enclosure that at least partially envelopes the first opening.

* * * * *